United States Patent [19]

Bell, Jr.

[11] 3,809,847
[45] May 7, 1974

[54] METHOD AND APPARATUS FOR ELECTRICAL DISCHARGE MACHINING

[75] Inventor: Oliver A. Bell, Jr., Mooresville, N.C.

[73] Assignee: Colt Industries Operating Corp., New York, N.Y.

[22] Filed: Dec. 14, 1972

[21] Appl. No.: 314,997

[52] U.S. Cl............................ 219/69 P, 219/69 C
[51] Int. Cl............................................... B23k 9/16
[58] Field of Search................ 219/69 R, 69 C, 69 P

[56] References Cited
UNITED STATES PATENTS

| 3,590,317 | 6/1971 | Sennowitz | 219/69 P X |
| 3,769,483 | 10/1973 | Bell et al. | 219/69 C |
| 3,705,969 | 12/1972 | Bell | 219/69 C X |
| 3,614,368 | 10/1971 | Lobur | 219/69 P |
| 3,585,340 | 6/1971 | Hockenberry | 219/69 C |

Primary Examiner—J. V. Truhe
Assistant Examiner—Hugh D. Jaeger
Attorney, Agent, or Firm—Hauke, Gifford, Patalidis & Dumont

[57] ABSTRACT

Method and apparatus of the digitally controlled type for providing machining power pulses of predetermined on-off time duration. Included in the circuit are separate on-time generators and off-time generators, together with counter means for presetting incrementally the time of operation of each generator. Included in the circuit is a means for providing a start pulse to enable the operation of the on-time generator in accordance with the time of initial gap breakdown.

50 Claims, 6 Drawing Figures

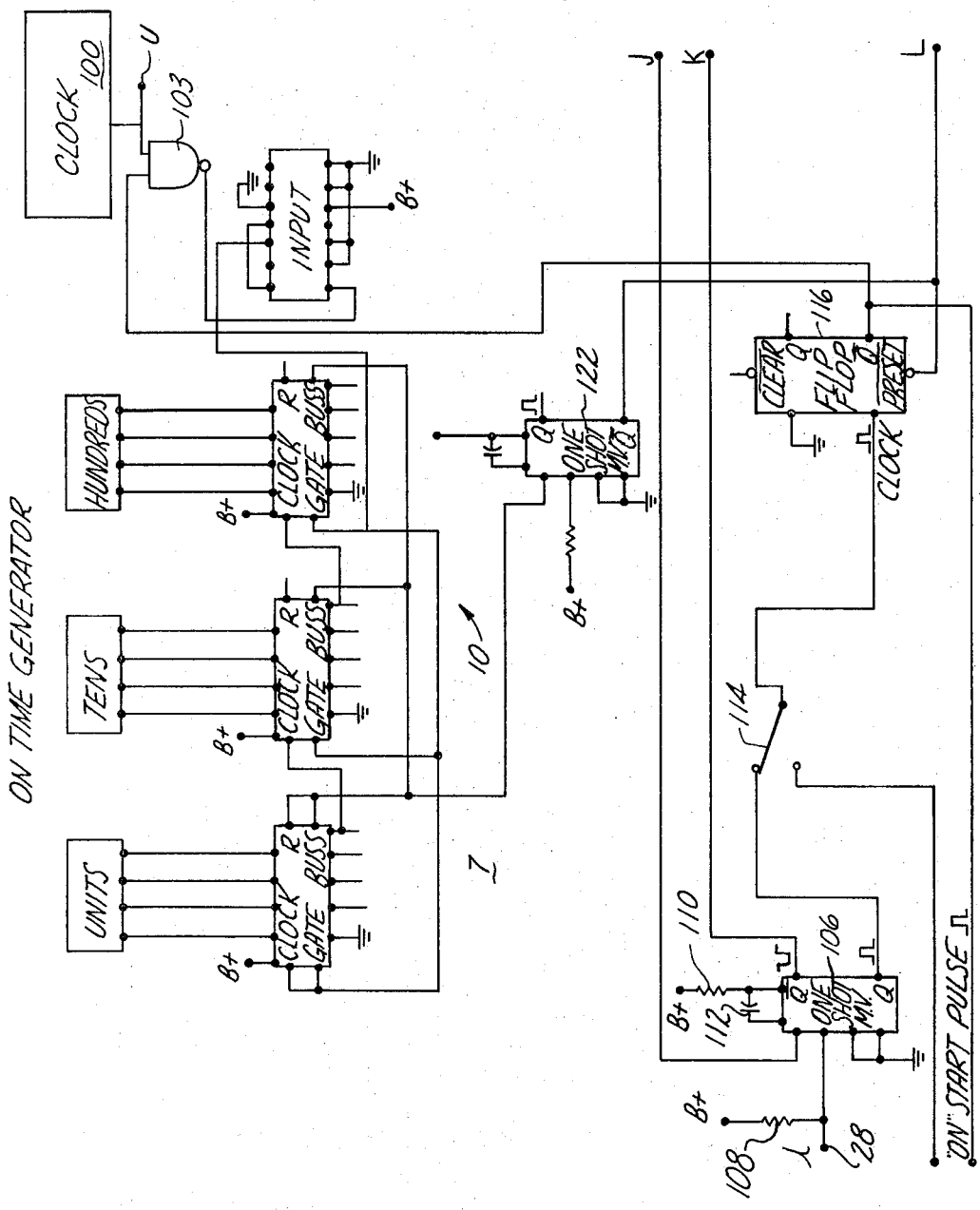

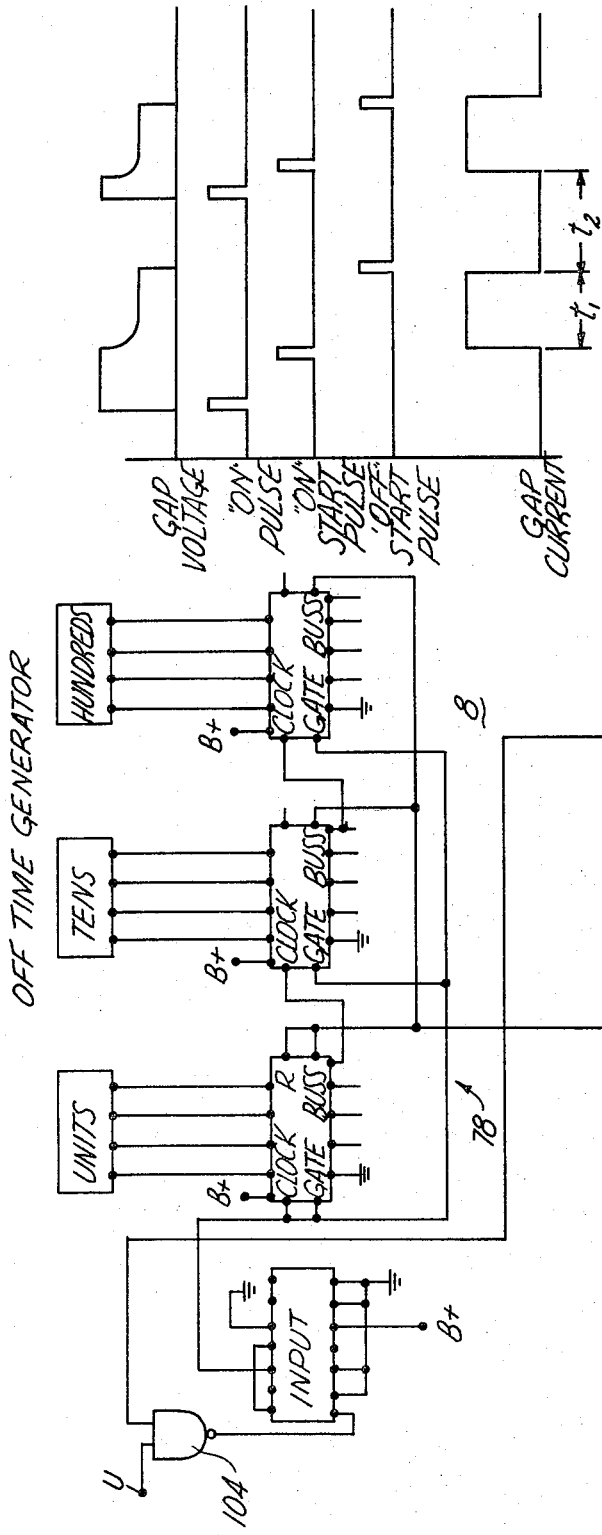
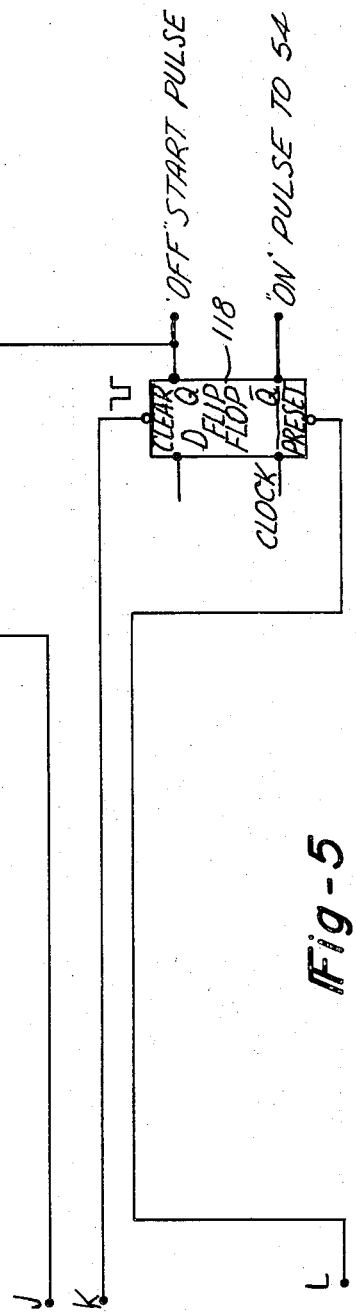
Fig-5
Fig-6

METHOD AND APPARATUS FOR ELECTRICAL DISCHARGE MACHINING

BACKGROUND OF THE INVENTION

The field to which my invention relates is that generally known as electrical discharge machining sometimes hereinafter referred to as EDM, in which material is removed from an electrically conductive workpiece by the erosive action of electrical gap discharges between a tool electrode and the workpiece. A dielectric coolant is circulated and recirculated through the gap usually under pressure during machining operation. An electrode or workpiece servo feed system is used to provide relative movement and thus maintain an optimum gap spacing between the electrode and workpiece as the workpiece material is being removed.

It is important in electrical discharge machining that the machining power pulses passed to the gap be of closely controllable on-off time and frequency to insure repeatability of results and to provide appropriate cutting action for the type of operation being carried out. For example, with a roughing machining operation, relatively low frequency, high current magnitude pulses would be used for cutting. With a finishing machining operation, higher frequency, lower current magnitude pulses would be employed. Various types of pulse generators which have this capability have been developed and are in current commercial use for electrical discharge machining. For example, a common type of electrical discharge machining power supply includes as the principal part of its machining power pulse generator an astable multivibrator in which on-off time and frequency are controlled and preset by a ganged capacitor and resistor arrangement. One example of this type of pulse generator is shown and described in Sennowitz, U.S. Pat. No. 3,649,802 issued on Dec. 28, 1970 for "Protective System for Electrical Discharge Machining Power Supply Circuit" which patent is of common ownership herewith.

Other types of pulse generators are in use which include various arrangements and combinations of astable multivibrators and oscillators to further control the machining power pulse duration and frequency. An example of one power supply circuit and generator of this type is shown in Rhyner U.S. Pat. No. 3,536,880 issued on Oct. 27, 1970, for "Method and Apparatus for Machining through Intermittent Electric Discharges."

It is important in any electrical discharge machining pulse generator that the operator be enabled to preset pulse on-time, off-time and frequency and it is likewise important that he be informed of the exact setting at which the equipment is operating. It has further been found an advantage to provide a novel timing and pulse initiating circuit which coincides with the initial gap breakdown occurring for each pulse generated so that uniform power content pulses are assured. To this end, the present invention includes an improved arrangement and apparatus for responding to gap breakdown in such way as to properly control the inception of each machining power pulse and initiate the operation of the on-time pulse and the next following off-time pulse.

SUMMARY OF THE INVENTION

My invention will be seen to provide an EDM pulse generator particularly adaptable for controlling in a precisely controllable and accurate manner the operation of one or a bank of electronic output switches which have their power conducting electrodes connected between a DC power supply and the gap for providing the machining power pulses. The present invention while it discloses a preferred embodiment including transistors as the electronic switches is not so limited. By substitution and minor revision of the circuits, it will be possible for one skilled in the electronics art to substitute other electronic switches for the transistors. By "electronic switch," I mean any electronic control device having two or more electrodes comprising at least two principal or power conducting electrodes acting to control current flow in the power circuit, the conductivity between the principal electrodes being controlled by a control electrode within the switch or by change of polarity of voltage applied to one of the principal electrodes whereby the conductivity of the power circuit is controlled statically or electrically without movement of any mechanical element within the switch. Included in this definition are electronic tubes, transistors, silicon controlled rectifiers, and similar semi-conductor devices. The electronic output switches which are in the circuit of the present invention are controlled by a combination of transistor-transistor logic (TTL) type integrated circuits of medium scale integration complexity such as the types now made and sold by the National Semiconductor Corporation of Santa Clara, California. Such circuits are available in a variety of combinations for use in the numerical control industry and the incorporation of such devices in the circuits of the present invention serves to greatly reduce their overall cost and add to their reliability of operation.

BRIEF DESCRIPTION OF THE DRAWINGS

The present invention which will be described in the appended specification is illustrated schematically and diagrammatically by the accompanying drawings in which like elements appearing in the different views are identified by like reference numerals and in which:

FIG. 3 is a combined schematic and block diagrammatic showing of the basic elements and parts of an electrical discharge machining power supply and connections for the several control inputs and outputs required for the operation of a preferred embodiment the present invention;

FIGS. 4 and 5 are combined schematic and block diagrammatic showings of a second preferred embodiment of the present invention; and FIG. 6 is a voltage current waveform diagram plotted against time and illustrating the general mode of operation of the present invention.

DETAILED DESCRIPTION

Figure 1:
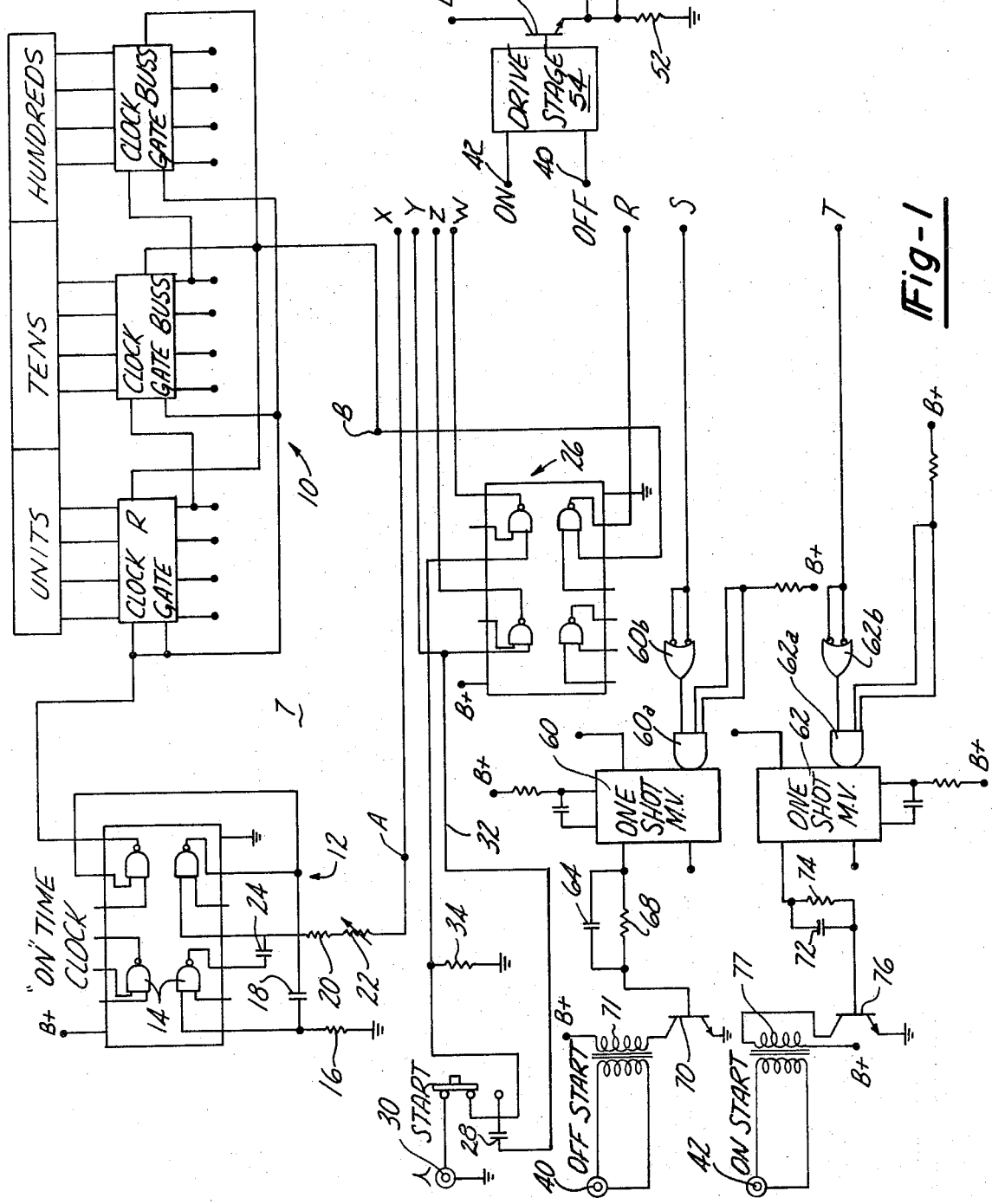
FIGS. 1 and 2 are schematic, partially block diagrammatic showings of one embodiment of this invention.
Figure 2:
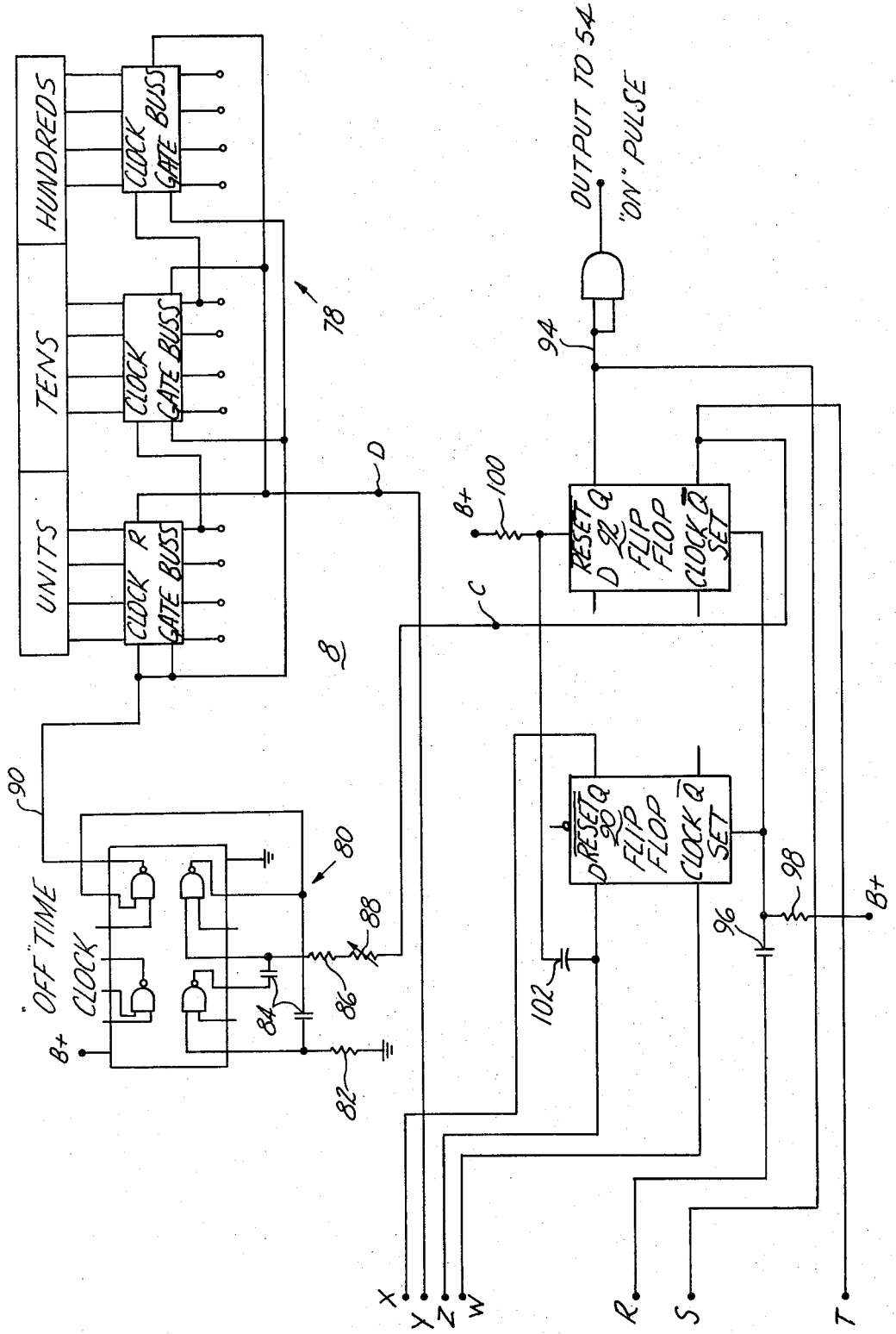

The basic operating elements of the EDM pulse generator include an on-time pulse generator 7 shown in FIG. 1 and an off-time pulse generator 8 shown in FIG. 2. The on-time generator includes an on-time decade counter 10 and an on-time clock pulse source 12 associated with it. The decade counter 10 is shown in block form and includes three stages for presetting units, tens and hundreds, preferably through the operation of an associated thumb wheel type switch. The counter 10 can be used for either an up or a down counting mode of operation. In the present embodiment, the counter 10 is of the countdown or count to zero type. Pulses with on-time of 1 to 999 microseconds may be preset on the counter 10 with a visible readout available to inform the operator of what its exact setting is. An example of one type of counter appropriate for use in connection with the present invention is the counter made and sold by Motorola Semiconductor Products, Inc. of Phoenix, Arizona, namely its model MC4016D. A source of clock pulses for the on-time counter 10 is provided by the clock pulse source 12. The counter 10 is of the digital integrated circuit type and includes a plurality of gates 14 connected as is shown with externally connected RC timing networks including resistor 16, capacitor 18; fixed resistor 20, rheostat 22 and capacitor 24 coupled to the input at terminal A. The output from the on-time clock 12 is passed through its output lead to the clock terminal of the lefthand or units portion of the counter 10. The counter 10 operates in the countdown mode, that is providing a number of down count pulses equal in number to the preset condition of the units, tens and hundreds on the counter 10. The output from the output buss of the several stages for the counter 10 is passed to a nand gate 26. The nand gate 26 may be of the quadruple two input nand gate type such as the DM 7400 model produced and sold by the National Semiconductor Corporation. One output from the nand gate 26 is provided through its upper output lead to a terminal W to provide a control output to the next following flip-flop stage 90 which stage will be explained in connection with FIG. 2. A second output from the nand gate 26 is provided through its lower output lead and a terminal R to subsequent stages as will likewise be shown in FIG. 2.

Also included in the FIG. 1 drawing are the three left hand portions which are identified as the start pulse circuit, the on-start circuit and the off-start circuit. The start pulse circuit for which a pair of test contacts and a capacitor 28 are shown includes an input terminal 30. The arc start input signal from the terminal 30 is one of the several inputs for nand gate 26 and is passed through an input lead 32. A resistor 34 is connected in the circuit as shown.

Reference is now made to the FIG. 3 drawing which shows the connections in the machining gap circuit of the terminal 30 which is adapted to receive the start pulse. Illustrated in the FIG. 3 drawing are the basic parts of the power supply which parts include a DC power source 36 and an electronic output switch 38 herein embodied as an NPN transistor. It will be understood that the transistor 38 may be either a single high power capability transistor or, alternately, a plurality of transistors connected in parallel in an output transistor bank. The transistor 38 according to the present invention is turned on and off in precisely controlled operation through the on-off pulses at the two left hand input terminals. The terminals are suitably labelled "off" and "on" and identified by the numerals 40 and 42. Correspondingly numbered terminals are included at the left hand side of the FIG. 1 circuit. It will be seen that the output transistor switch 38 is turned on and off through the operation of a prior stage drive transistor 44 and through a parallel RC network including capacitor 46 and resistor 48 and through a base connected series diode 50. The transistor 44 further has a load resistor 52 connected in series with its emitter. One or more intermediate drive stages 54 may be included in the power supply circuit to provide for the necessary pulse shaping and for the amplification of the control input signals received at the terminals 40 and 42. The actual machining power pulse on and off times are determined by the triggering pulses received at the "off" and "on" terminals 40 and 42. The start pulse indicated at the terminal 30 is derived when after application of voltage to the gap there has been a gap breakdown and ionization in such manner as to provide an output pulse from the signal transformer 56. The signal transformer 56 has its primary winding connected across a resistor 58 which resistor is connected in series with a diode 59 and the collector of the output transistor switch 38. This insures that the timing control of the on pulse duration commences exactly at the same point in each machining cycle and coincidental with the gap breakdown. This mode of operation and the interrelationship of the several parts of the circuit will be clarified further by the voltage and current waveform diagrams of FIG. 6.

Also shown in the FIG. 1 drawing is the circuit used to provide the off-pulse at the terminal 40. This circuit includes a one-shot multivibrator 60 and a pair of gates 60a, 60b. Responsive to a control signal received at a terminal S, the one-shot multivibrator 60 will provide an output through an RC signal network including a parallel connected capacitor 64 and resistor 68 to the base of a transistor 70. The transistor 70 is of the NPN type and has the primary winding of a pulse transformer connected in series with its collector and with a B plus voltage source. Responsive to the pulse output from the one-shot multivibrator 60, the transistor 70 will be triggered into conduction to provide the off-pulse output from the terminal 40 to start the predetermined off-time pulse duration.

The circuit for providing the on-pulse triggering is associated with the terminal 42 at the lower left hand side portion of the FIG. 1 schematic. The one-shot multivibrator 62 receives its input through a terminal T and a pair of gates 62a, 62b, to provide a control signal through the RC network including a parallel capacitor 72 and resistor 74 and thence to the base of an NPN transistor 76. The transistor 76 has connected in series with its collector a transformer primary 77 and a suitable B plus voltage source. Responsive to the conduction of the transistor 76 through its triggering from the one-shot 62 there will be provided an on-time initiating pulse through the terminal 42.

The FIG. 2 drawing taken with the FIG. 1 drawing shows the counter and clock pulse source controlling the off-time generator which is identified generally by the numeral 8. The off-time generator 8 is similar in its integrated circuit components to the on-time generator 7. It includes an off-time clock 80 with externally connected timing RC circuits including resistor 82, capacitor 84, and resistors 86 and 88 connected with a capacitor 85. The output from the off-time clock 80 is taken from its output lead 90 and used to countdown from the preset digital setting of the counter 78. The counter 78 is a programmable decade counter identical to the counter 10 and with similar clock, gate and buss terminals as illustrated.

The FIG. 2 drawing further shows a pair of flip-flop stages 90 and 92 which are used to initiate the on-time clock 12 operation and the off-time clock 80 operation, respectively. A further output is taken through a lead 94 at the right hand end of the flip-flop 92 which output is provided to the power module drive stage 54 to furnish the "on" pulse thereto. A further control output is taken from the Q̄ terminal of the flip-flop 92 and provided to terminal T. External resistor and capacitor networks are included in the circuit as required. With relation to flip-flop 90, an RC network including capacitor 96 and resistor 98 is coupled, as shown. With respect to flip-flop 92, a resistor 100 and a capacitor 102 are included. The flip-flops 90 and 92 are embodied as dual, D-type, edge triggered flip-flop circuits which provide complementary Q and Q̄ outputs.

FIGS. 4 and 5 show a different embodiment of the present invention in which a single clock 100 is employed to provide for the operation of both the on-time generator 7 and the off-time generator 8. The clock 100 is preferably of the crystal controlled type and operates at a 10,000 MC. rate. A pair of 2 input nand gates 103 and 104 are connected to the output of the clock pulse source 100 as shown. The counters 10 and 78 are identical to the counters of corresponding number designation shown in the FIG. 1 and 2 circuit and are also of the decade programmable type in which the settings are made manually and in which a visual display is then maintained. The input to the embodiment of FIGS. 4 and 5 is through the left-hand terminal identified by the numeral 28 which corresponds to the like numbered terminal in FIG. 1. As illustrated in FIG. 3, the arc start pulse is taken from the pulse transformer 56 which is coupled to the series resistor 58 in the EDM gap. Included at the left hand input end of the circuit is a one-shot multivibrator 106. The one-shot multivibrator 106 has coupled to it a positive voltage source, a resistor 108, and an external timing circuit including a separate positive voltage source, a resistor 100 and a capacitor 112. According to the setting of a switch 114 in its uppermost position the control system is readied for operation. An additional pair of flip-flop stages 116 and 118 are included in the circuit to control the operation of the on and off-time clock pulse outputs from the clock 100 to the counters 10 and 78 in a manner which will be discussed in the section entitled "Description of Operation" hereinafter.

The basic integrated circuit building blocks used in the embodiments of FIGS. 1 and 2 and of FIGS. 4 and 5 are the same. In both embodiments, there are three basic control pulses utilized in the manner demonstrated in the wave-forms of FIG. 6 to initiate the on-time pulse duration count responsive to gap breakdown, to terminate the on-pulse duration and initiate the off-pulse duration count, and finally to terminate the off-pulse duration and ready the circuit for the next following arc start pulse as derived from gap breakdown. In this manner, all of the machining power pulses provided to the gap are of like time duration and separated by like time duration intervals. This gives rise to a greatly improved mode of operation as has been discussed before.

FIGS. 4 and 5 further show a one-shot multivibrator 122 coupled to the on-time counter 10 which serves the function of providing a discrete pulse output upon the completion of the predetermined on-time duration. The on-time finish pulse is used to preset flip-flops 116 and 118. It will be seen that the one-shot multivibrator 106 is similarly coupled to the off-time counter 78 and receives from it a pulse after the count completion and in turn generates an off-time finish pulse which is used to as an input to the flip-flops 116. It will be further seen that there is provided an output from the Q̄ output of flip-flop 116 which is coupled to the nand gate 103 to initiate clock pulses and the operation of the on-time generator 7 at a suitable time in the cycle. Correspondingly, there is an output provided from the Q output of the flip-flop 118 which initiates through nand gate 104 the operation of the off-time generator 8.

DESCRIPTION OF OPERATION

A description of operation will now be given with particular reference to the system shown in FIGS. 1 through 3 and with reference to the voltage and current waveform diagrams of FIG. 6. The upper line in the FIG. 6 voltage waveform shows typical gap voltage excursions during EDM operation. It will be understood that the high voltage level shown is that which is present during gap open circuit condition prior to gap breakdown and the gap ionization drop in voltage occurs as shown in the latter part of the pulse. For convenience, the description will be started at the point at which the off-time count has just been completed. The voltage at the point B in FIG. 1 has gone to a positive approximately four volt level to provide a positive input pulse to the input terminal of the nand gate 26. The output signal from the output terminal to point Z goes to the ground and puts a "0" on the input to the input D of the flip-flop 90. At the same time, a negative pulse is provided through the reset input terminal of the second flip-flop 92. This puts a "1" at the Q̄ output of the flip-flop 92 and at the point C. The "1" at the point C stops the operation of the off-time clock 80 and also operates the one-shot multivibrator 62. A positive output pulse is then provided to the base of NPN transistor 76 and an output pulse is sent to the power module through the lead 94. This provides the "on" pulse which serves to initiate or turn on the arc voltage. As soon as the gap breakdown occurs and current begins to flow across the gap as illustrated in FIG. 6 lowermost line, the timing portion of the circuit begins to operate.

At the time of the arc breakdown, a start pulse is initiated through the pulse transformer 56. As shown in FIG. 3, the pulse transformer 56 has its primary connected across the series resistor 58 and its output at terminal 30. A start pulse input is shown also in FIG. 1 as one of the inputs to the nand gate 26. This causes the output from the Q terminal of the flip-flop 90 and the voltage at point A to go to "0" and initiates the operation of the on-time clock 12. The output from the output terminal of the on-time clock 12 to the units stage of the counter 10 goes to "0" and the on-time counter 10 resets to a predetermined or preset number up to 999 as already programmed. Approximately one microsecond later when the clock 12 goes to 0, it again counts down one and continues on each negative going clock output pulse. When the voltage at terminal B goes to a level indicating "1," this "1" is fed into the nand gate 26. The output from the nand gate 26 to point R goes to ground. A negative spike is thus provided at the set input of both flip-flops 90 and 92. The Q output of both flip-flops 90 and flip-flop 92 goes to a "1." A "1" thus appears at point A which is the input to the on-time clock 12. This stops the operation of the on-time clock 12. A "1" is also applied through point S to the input of the one-shot multivibrator 60. This generates a positive pulse through the output terminal 40 which pulse is the off-start pulse corresponding to the pulse in the fourth line of the FIG. 6 waveform. This represents the pulse which turns the arc off and marks the end point of the machining power pulse on-time duration. At the same time, the $\overline{Q}$ output of the flip-flop 92 goes to ground and initiates the operation of the off-time clock 80. The off-time counter 78 operates in a count down manner until off-time counter 78 reaches a zero point. The voltage at point D goes to "1" and the cycle will start over.

The circuit shown in FIGS. 4 and 5 has essentially the same mode of operation as set forth above with regard to the two clock embodiment of FIGS. 1 and 2. The principal difference lies in the simplification of the gating system and in the reduction of clocks required to one. In the FIGS. 4 and 5 embodiment the one-shot multivibrator 122 provides an on-time finish pulse which signals the end of the operation of the on-time counter 10 and furnishes a $\overline{preset}$ signal to the flip-flops 116 and 118. This $\overline{preset}$ signal forces the Q outputs of both flip-flops to one which in turn provides the off-start pulse and initiates through gate 104 the operation of the off-time counter 78. In a like manner, the one-shot multivibrator 106 provides an output which represents the off-time finish pulse as controlled by the signal at point D at the end of operation of the off-time counter 78. An "on" pulse from flip-flop 118 is provided to the power module 54. The circuit is then in readiness for the next cycle of operation and the on-pulse duration upon receipt of an arc start pulse at the left hand input terminal 28.

The advantages of the system provided by my invention become apparent from a review of the voltage and current waveforms of FIG. 6. It is understood that the gap voltage and the time and duration of machining power pulses to the gap may vary widely because of differing conditions in the gap which arise from changes in the gap spacing, the degree of contamination in the gap, voltage fluctuations and the like so that the final time duration and energy content of each machining power pulse cannot be rigidly controlled. This problem is solved by the present invention by providing precisely controllable machining power pulses as shown in the final line of the FIG. 6 diagram. The sequence followed is to first provide an "on" pulse which provides voltage of a magnitude sufficient to cause gap breakdown. When this breakdown occurs the start pulse is initiated and serves to begin the operation of the on-time counter 10 which has already been preset to determine exactly what on-time is desired. The time $T_1$ between each on start pulse and the following off start pulse is thus rigidly controlled by the preprogramming of the on-time generator 7. The off-time indicated as $T_2$ in the bottom waveform is precisely controlled by the operation of the off-time generator 8 in accordance with its preprogramming. At the end of the off-time there is provided again an "on" pulse and the on-time duration again is initiated when gap breakdown actually occurs.

It will thus be seen that I have provided by my invention a digital type pulse generator for electrical discharge machining which takes into account the conditions at the gap and uses to initiate the precise timing and control of machining power pulses.

I claim:

1. In an electrical discharge machining apparatus including an electronic output switch and a power supply operatively connected to a machining gap for providing machining power pulses of predetermined on and off time duration thereto, a digital type machining power pulse circuit including a source of periodic clock pulses, an on-time generator and an off-time generator, means for presetting incrementally through a preset plurality of clock timing pulses the total time of operation of each of said generators, one independently of the other, each of said generators having an output operatively coupled to said output electronic switch for providing composite on and composite off pulses thereto, respectively, and a means coupled to said gap and responsive to each gap breakdown for providing a start pulse to enable each operation of said on-time generator.

2. The combination as set forth in claim 1 wherein said on-time and off-time generators include separately presettable counters for precisely controlling their on-off time duration.

3. The combination set forth in claim 1 wherein a counter is associated with each of said generators, said counters being of the decade programmable type and operable in a countdown to zero mode of operation to provide signals to control pulse on and off time, respectively.

4. The combination as set forth in claim 1 wherein said means for providing a start pulse to initiate the operation of said on-time generator comprises a transformer having its primary coupled across a resistor, said resistor connected in series with said gap.

5. The combination as set forth in claim 1 wherein a single clock pulse source is operatively connected to both of said generators for controlling their operation.

6. The combination as set forth in claim 1 wherein said on-time and off-time generators are each coupled operatively to the control electrode of said electronic output switch through a different pulse transformer.

7. The combination as set forth in claim 1 wherein a one-shot multivibrator is operably coupled between said on-time generator and said output switch for providing an on-time triggering pulse thereto.

8. The combination as set forth in claim 1 wherein a one-shot multivibrator is operably coupled between said off-time generator and said output switch for providing a discrete off-time triggering pulse thereto.

9. The combination as set forth in claim 1 wherein an on-time clock is coupled to said on-time generator for controlling its operation and a separate off-time clock is coupled to said off-time generator for controlling its operation.

10. The combination as set forth in claim 9 wherein each of said generators includes a three stage programmable decade counter and further includes a manually operable means for presetting the units, tens, and hundreds values of said counter for the on-off time durations, respectively.

11. In an electrical discharge machining apparatus including an electronic output switch and a power supply operatively connected to a machining gap for providing machining power pulses of predetermined on and off time thereacross, a digital type machining power pulse circuit including an on-time generator and an off-time generator, means for presetting incrementally through a preselected plurality of clock timing pulses the total time of operation of each of said generators, one independently of the other, each of said generators having an output coupled operatively to said electronic output switch for providing on and off-time initiating pulses, respectively, an on-time clock and an off-time clock, each coupled to the on-time generator and off-time generator, respectively, for controlling their duration of operation, and a means coupled to said gap and responsive to gap breakdown subsequent to the application of voltage to the gap for providing a start pulse to enable each operation of said on-time generator.

12. The combination as set forth in claim 11 wherein a separate counter is associated with each of said generators and its clock, each of said counters being of the decade programmable type and operable in a countdown mode of operation to provide signals to control pulse on and off time, respectively.

13. The combination as set forth in claim 11 wherein said means for providing a start pulse to initiate the operation of said on-time generator includes a transformer having its primary coupled across a resistor, said resistor connected in series with said gap.

14. The combination as set forth in claim 11 wherein said on-time and off-time generators are each coupled to the control electrode of said electronic output switch through a different pulse transformer.

15. The combination as set forth in claim 14 wherein said last-mentioned pulse transformers are differently phased relatively to said output switch for providing appropriate polarity pulses thereto.

16. The combination as set forth in claim 11 wherein a one-shot multivibrator is operably coupled between said on-time generator and said output switch for providing a discrete on-time triggering pulse thereto.

17. The combination as set forth in claim 12 wherein each of said counters comprises a three stage, programmable decade counter and includes a manually operable means for presetting the units, tens and hundreds values for controlling the on-off time duration, respectively.

18. The combination as set forth in claim 17 wherein said manually operable means includes a visual display for the units, tens and hundreds value settings.

19. In an electrical discharge machining apparatus including an electronic output switch and a power supply operatively connected to a machining gap for providing machining power pulses thereto, a digital type machining power pulse generator including a clock, a system for controlling machining power pulse on-time and off-time comprising an on-time generator and an off-time generator, means for presetting incrementally through a preselected plurality of clock timing pulses the total time of operation of said on-time generator and said off-time generator, said generator having an output operably coupled to said electronic output switch for providing on-time and off-time triggering pulses thereto, and a means coupled to said gap and responsive to each gap breakdown for providing a start pulse to each time enable the operation of said on-time generator.

20. The combination as set forth in claim 19 wherein said on-time generator includes a presettable counter for precisely controlling the magnitude of on-time duration.

21. The combination as set forth in claim 19 wherein said counter is of the decade programmable type and operable to provide signals to control pulse on-time.

22. The combination as set forth in claim 19 wherein said means for providing a start pulse to initiate the operation of the on-time generator includes a resistor in series with said gap.

23. The combination as set forth in claim 19 wherein a clock pulse source is coupled to said generator for controlling its precise timing of operation.

24. The combination as set forth in claim 19 wherein said on-time generator is coupled to the control electrode of said electronic output switch through a pulse transformer means.

25. The combination as set forth in claim 19 wherein a one-shot multivibrator is operatively oupled between said on-time generator and the control electrode of said output switch for providing a discrete on-time triggering pulse thereto.

26. The combination as set forth in claim 20 wherein said counter comprises a three stage, programmable decade down counter and includes a manually operable means for presetting the units, tens, and hundreds values for the on-time duration.

27. In an electrical discharge machining apparatus including at least one output transistor switch and a power supply operatively connected to a machining gap for providing machining power pulses thereto, a digital type machining power pulse circuit including an on-time generator and an off-time generator, means for presetting incrementally through a selected number of clock timing pulses the total time of operation of each of said generators, one independently of the other, each of said generators having its output coupled operatively to the base of said output transistor switch for providing on and off triggering pulses thereto, and a means coupled to said gap and responsive to breakdown of said gap for providing a start pulse to enable the predetermined time operation of said on-time generator.

28. The combination as set forth in claim 27 wherein said on-time and off-time generators each include a separately presettable counter for precisely controlling the on-off time pulse durations.

29. The combination as set forth in claim 27 wherein a digital counter is associated with each of said generators for controlling its operation, said counter being of the decade programmable type.

30. The combination as set forth in claim 27 wherein a counter is associated with each of said generators for controlling its operation, said counter being of the decade programmable type and operable in a countdown mode of operation to provide signals separately to control machining pulse on-time and off-time, respectively.

31. The combination as set forth in claim 27 wherein said means for providing a start pulse to initiate the operation of said on-time generator comprises a transformer, said transformer having its primary coupled across a resistor, said resistor connected in series with said gap.

32. The combination as set forth in claim 30 wherein a separate clock pulse source is operatively connected to both of said counters for controlling their operation.

33. The combination as set forth in claim 27 wherein said on-time and off-time generators each have their output coupled to the base of said output transistor through a different pulse transformer means.

34. The combination as set forth in claim 27 wherein a one-shot multivibrator is operatively coupled between said on-time generator and said output transistor base for providing a discrete on-time triggering pulse thereto.

35. The combination as set forth in claim 27 wherein a one-shot multivibrator is operatively coupled between said off-time generator and said output transistor base for providing a discrete off-time triggering pulse thereto.

36. The combination as set forth in claim 27 wherein a one-shot multivibrator is operatively coupled between said on-time generator and said output transistor base for providing a discrete on-time triggering pulse thereto, wherein a second one-shot multivibrator is further operatively coupled between said off-time generator and said output transistor base for providing a discrete off-time triggering pulse thereto.

37. In an electrical discharge apparatus including at least one output transistor switch and a power supply operatively connected to a machining gap for providing machining power pulses of predetermined on-off time thereto, a digital type machining power pulse circuit including an on-time generator and an off-time generator, means for presetting incrementally the total time operation of each of said generators by providing a separate series of time base pulses thereto, one independently of the other, each of said generators having an output coupled operatively to the base of said output transistor switch for providing alternate on and off triggering pulses thereto, and a control means operably coupled to said gap and responsive to the breakdown of said gap for providing a start pulse to initiate the predetermined time operation of said on-time generator, said control means enabled in turn by the termination of operation of said off-time generator.

38. The combination as set forth in claim 37 wherein said on and off-time generators include separately presettable counters of the count to zero type for precisely regulating the on-off time pulse durations.

39. The combination as set forth in claim 37 wherein a digital counter is associated with each of said generators, said counter being of the decade programmable type.

40. The combination as set forth in claim 37 wherein said control means for providing a start pulse to initiate the timing operation of said on-time generator includes a transformer operably connected to said gap.

41. The combination as set forth in claim 37 wherein a clock pulse source is operatively connected to both of said generators for controlling their operation.

42. The combination as set forth in claim 37 wherein a pair of clock pulse sources are provided, each operatively connected to a different one of said generators for controlling its timed operation.

43. The combination as set forth in claim 37 wherein said on and off-time generators, respectively, are each coupled to the base electrode of said output transistor through a different pulse transformer means.

44. The combination as set forth in claim 37 wherein a one-shot multivibrator is operably connected between said on-time generator and said output transistor base for providing a discrete on-time triggering pulse thereto.

45. The combination as set forth in claim 37 wherein a one-shot multivibrator is operably connected between said off-time generator and said output transistor base for providing a discrete off-time triggering pulse thereto.

46. The combination as set forth in claim 38 wherein each of said counters comprises a multiple stage programmable decade counter and includes a manually operable means for presetting and exhibiting the values of said multiple stages for controlling the on-off time durations, respectively.

47. The method of electrical discharge machining by providing machining power pulses of precisely controllable on-off time duration to a machining gap comprising the steps of:
   a. providing a voltage to the gap of a magnitude sufficient to initiate gap breakdown,
   b. responding to gap breakdown to initiate a start pulse,
   c. using the start pulse to initiate the running of a predetermined and digitally controlled on-time pulse duration,
   d. terminating the on-time pulse duration,
   e. providing an off-time pulse duration of similar digitally controlled duration.

48. The method of electrical discharge machining by providing pulses to a machining gap which pulses are precisely controllable in their on-off time duration comprising the steps of:
   a. applying an ionizing voltage to the gap,
   b. sensing for the occurrence of gap breakdown,
   c. initiating an on-time pulse of digitally predetermined duration responsive to such occurrence,
   d. terminating the on-time pulse,
   e. initiating an off-time pulse of digitally predetermined duration, and
   f. terminating the off-time pulse.

49. The combination as set forth in claim 48 wherein step (a) comprises supplying the voltage to the gap through the closure of an electronic switch associated with said gap.

50. The combination as set forth in claim 48 wherein step (b) comprises sensing the gap breakdown through a pulse transformer operably connected to the machining gap.

* * * * *